(12) United States Patent
Drivon et al.

(10) Patent No.: US 11,543,059 B2
(45) Date of Patent: Jan. 3, 2023

(54) CLAMPING COLLAR WITH RETAINING BAR

(71) Applicant: CAILLAU, Issy les Moulineaux (FR)

(72) Inventors: Stéphane Drivon, Romorantin (FR); Fabrice Prevot, Selles sur Cher (FR)

(*) Notice: Subject to any disclaimer, the term of this patent is extended or adjusted under 35 U.S.C. 154(b) by 0 days.

(21) Appl. No.: 16/924,396

(22) Filed: Jul. 9, 2020

(65) Prior Publication Data
US 2021/0018123 A1  Jan. 21, 2021

(30) Foreign Application Priority Data
Jul. 15, 2019 (FR) ..................... 19 07952

(51) Int. Cl.
F16L 23/16 (2006.01)
F16L 23/08 (2006.01)
F16L 23/036 (2006.01)

(52) U.S. Cl.
CPC .............. F16L 23/08 (2013.01); F16L 23/16 (2013.01); F16L 23/036 (2013.01)

(58) Field of Classification Search
CPC ......... F16L 23/036; F16L 23/16; F16L 23/08; F16L 23/026; F16L 23/003; F16L 23/04; F16L 17/04; F16L 17/06; F16L 21/06; F16L 21/065; F16J 13/065
USPC ....... 285/364, 410, 337, 367, 406, 420, 421, 285/236
See application file for complete search history.

(56) References Cited

U.S. PATENT DOCUMENTS

| 5,782,499 A * | 7/1998 | Gfrerer ................... F16L 23/08 |
| | | 285/420 |
| 7,399,005 B2 | 7/2008 | Rigollet et al. | |
| 9,016,731 B2 | 4/2015 | Rigollet | |
| 10,612,705 B2 | 4/2020 | Prevot et al. | |
| 2007/0126234 A1 * | 6/2007 | Wirth ................... F16L 21/065 |
| | | 285/410 |

(Continued)

FOREIGN PATENT DOCUMENTS

| EP | 1451498 B1 | 3/2006 |
| EP | 2598785 B1 | 9/2015 |
| EP | 3232107 A1 | 10/2017 |

(Continued)

OTHER PUBLICATIONS

English language abstract of FR3057918.

*Primary Examiner* — Zachary T Dragicevich
*Assistant Examiner* — William S. Choi
(74) *Attorney, Agent, or Firm* — Robert Facey

(57) ABSTRACT

A clamping system for connecting a first and a second tube whose opposite ends have clamping surfaces protruding from the cylindrical outer surface of the tubes. The system includes a collar having a belt able to be clamped around the clamping surfaces. The belt includes a first and a second flank between which an internal recess able to receive the clamping surfaces is delimited. The collar carries an external retaining device having a retaining bar, which protrudes axially from the first flank while being oriented transversely to the axis of the collar and which has a transverse retaining ridge, the bar being able, from a rest situation in which the retaining ridge projects towards the axis of the collar relative to the edge of the first flank in the unclamped situation of the collar, to be elastically deformed to space the retaining ridge away from the axis of the collar.

9 Claims, 4 Drawing Sheets

(56) References Cited

U.S. PATENT DOCUMENTS

2014/0217728 A1\* 8/2014 Ghirardi ................ F16L 23/08
             285/410

FOREIGN PATENT DOCUMENTS

FR       3057918 A1      4/2018
WO    WO-2019042550 A1 *  3/2019  .............. F16L 23/08

\* cited by examiner

CLAMPING COLLAR WITH RETAINING BAR

BACKGROUND

The present disclosure relates to a clamping system for connecting a first and a second tube whose opposite ends have clamping surfaces protruding from the cylindrical outer surface of said tubes.

A clamping system of this type is known, for example from European patents EP 1 451 498 and EP 2 598 785.

In such a system, the collar comprises a belt able to be clamped around the clamping surfaces of the tubes. The belt has flanks between which an internal recess is delimited in which the clamping surfaces of the tubes are disposed to carry out the clamping. The tubes are thus retained clamped relative to each other. As indicated in the aforementioned patents, it may be useful to pre-mount the clamping system on the end of at least one of the tubes before carrying out the clamping.

In order to allow a pre-mounting on the two tubes, EP 2 598 785 recommends that the clamping system comprises a washer, retained relative to the collar by fastening lugs, and comprising first and second pre-mounting lugs able to respectively cooperate with the first and the second tube to retain the washer, and therefore the entire clamping system, relative to the respective clamping surfaces of the tubes before the clamping. These pre-mounting lugs in this case comprise short lugs extending back above the frustoconical annular shape of the washer to cooperate with the clamping surface of the tube whose clamping surface is disposed between the belt and the washer. These pre-mounting lugs also include long lugs, which extend from the top of the washer in the opposite direction to the washer to cooperate with the clamping surface of the other tube.

In EP 2 598 785, the lugs of these two categories are elastically deformable. This device is generally satisfactory, but, for some applications, it is important to improve reliability of the retention of the lugs relative to the clamping surfaces, particularly as regards the long lugs. Indeed, concerning particularly long lugs, it may be difficult to ensure the right range of elastic deformation for some clamping diameters, particularly large diameters on the order of 5 cm or more. On the one hand, it is necessary to ensure that the modulus of elasticity of these lugs is sufficiently high so that they have the desirable elasticity for elastically recovering, after having been deformed upon engagement of the tube in the clamping system, a position ensuring the pre-mounted retention of this tube. They must then have the elastic responsiveness necessary in order not to be too easily deformed if traction is exerted on the tube in the direction of its disengagement from the clamping system. However, this elastic retention is useful only in the pre-mounted state, before the clamping. In the clamped state, it is on the contrary desirable that the lugs are deformed to be pressed inside the belt of the collar, without affecting the quality of the clamping. However, if the elastic modulus of the lugs is high, this latter property may be difficult to achieve in some cases, particularly for large-diameter collars. In addition, if the elastic modulus is too high, the engagement pushing force required for the clipping of the lugs on the clamping surface of the tube can be high, and difficult to achieve in a context of final mounting.

Thus, even though the system of EP 2 598 785 is satisfactory for a large number of applications, it is desirable to propose another solution allowing a pre-mounting of the clamping system at the end of the first tube substantially free from the aforementioned drawbacks, particularly for the large-diameter collars.

EP 1 451 498 proposes a system allowing a pre-mounting relative to a tube, using pre-mounting lugs also carried by the belt via a washer itself carried by the belt. The same problems as those mentioned above can arise for a pre-mounting relative to a single tube.

Other clamping systems are also known comprising a collar and a washer carried by the collar, the washer having internal lugs, able to grip inside one of the tubes, for pre-mounting the clamping system at the end of this tube. It may be useful to complete this system to also allow a pre-mounting relative to the other tube. For that, it is possible to use the long lugs proposed by EP 2 598 785 but, particularly for large-diameter collars, there is a need for another solution, substantially free from the abovementioned drawbacks.

SUMMARY

Generally, there is a need for a clamping system allowing controlled retention in the pre-mounted state relative to the clamping surface of one of the tubes it is intended to clamp.

Thus, the present disclosure relates to a clamping system for connecting a first and a second tube whose opposite ends have clamping surfaces protruding from the cylindrical outer surface of said tubes, the system comprising a collar which comprises a belt able to be clamped around said clamping surfaces, the belt having a first and a second flank between which an internal recess able to receive the clamping surfaces is delimited, the collar carrying an external retaining device which has a retaining bar, which protrudes axially from the first flank while being oriented transversely to the axis of the collar and which has a transverse retaining ridge, said bar being able, from a rest situation in which the retaining ridge projects towards the axis of the collar relative to the edge of the flank in the unclamped situation of the collar, to be elastically deformed to space the retaining ridge away from the axis of the collar.

Thus, the retention of the clamping system relative to the clamping surface of the first tube is particularly easy to implement. Indeed, during the fitting of the first tube inside the clamping system, the retaining bar behaves like the chord of an arc, which deflects outwardly to allow the passage of the clamping surface of the first tube, before naturally recovering its rest position, in which the retaining ridge interferes with the edge of the first flank. Geometrically, the part of the edge of the first flank which is then located radially outside the retaining ridge forms an arc whose said ridge forms the chord.

Optionally, the retaining ridge is formed at the end of a ramp.

Optionally, the external retaining device is fastened by a lug to the first flank of the belt, this lug being optionally welded on the first flank.

Optionally, the external retaining device comprises a polygonal frame, the retaining ridge being formed on one of the sides of the frame.

Optionally, the frame comprises two support sides through which the frame is supported by the collar.

Optionally, one of the support sides is fastened to the first flank and the other of the support sides is wedged against displacement relative to the collar.

Optionally, the external retaining device has two retaining bars, disposed on either side of the axis of the collar. Optionally, the two retaining bars extend between the two support sides.

The present disclosure will be clearly understood and its advantages will appear better upon reading the following detailed description of one embodiment represented by way of a non-limiting example.

DETAILED DESCRIPTION

Figure 1:
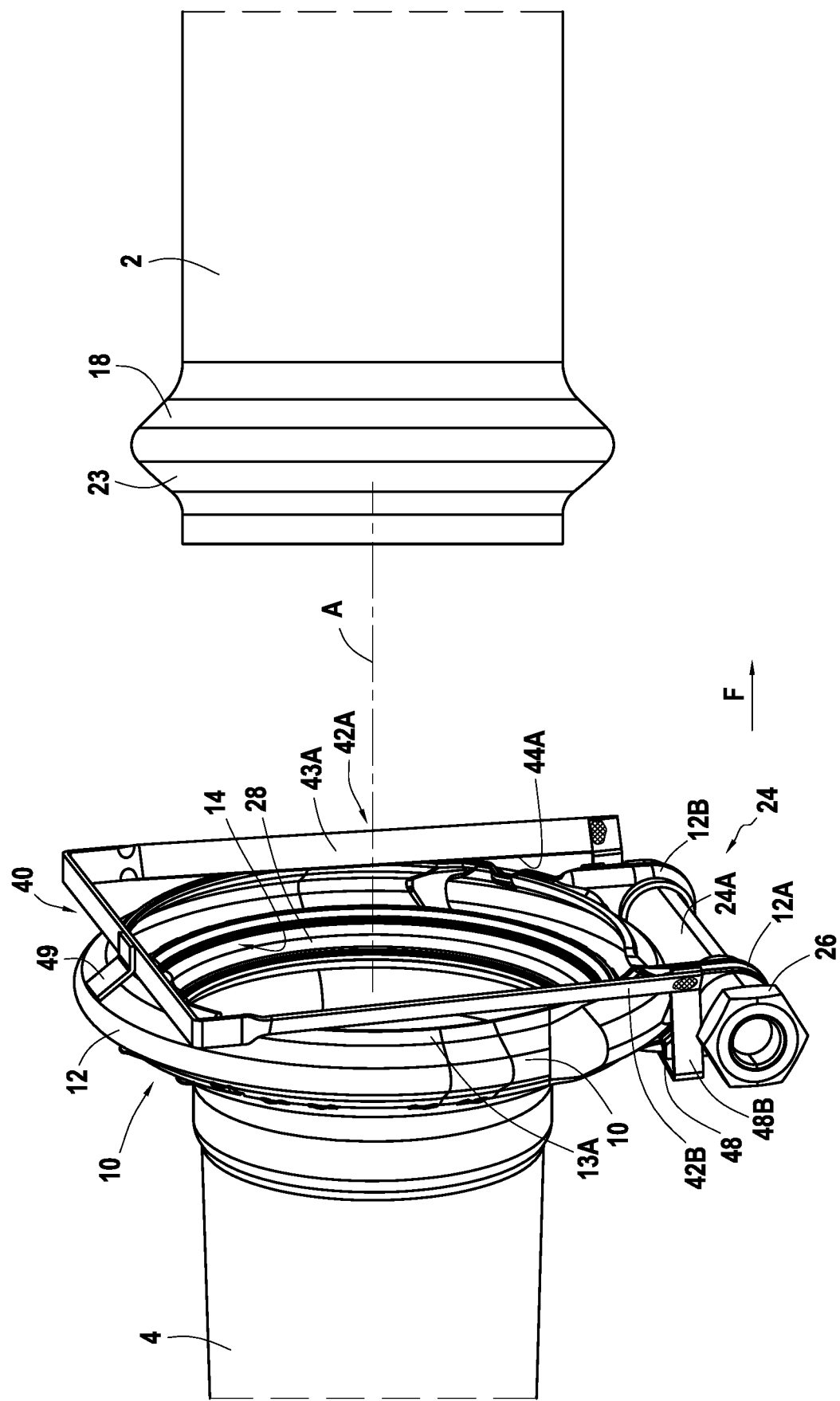
FIG. 1 is a perspective view of an assembly comprising a clamping system according to the present disclosure.
Figure 2:
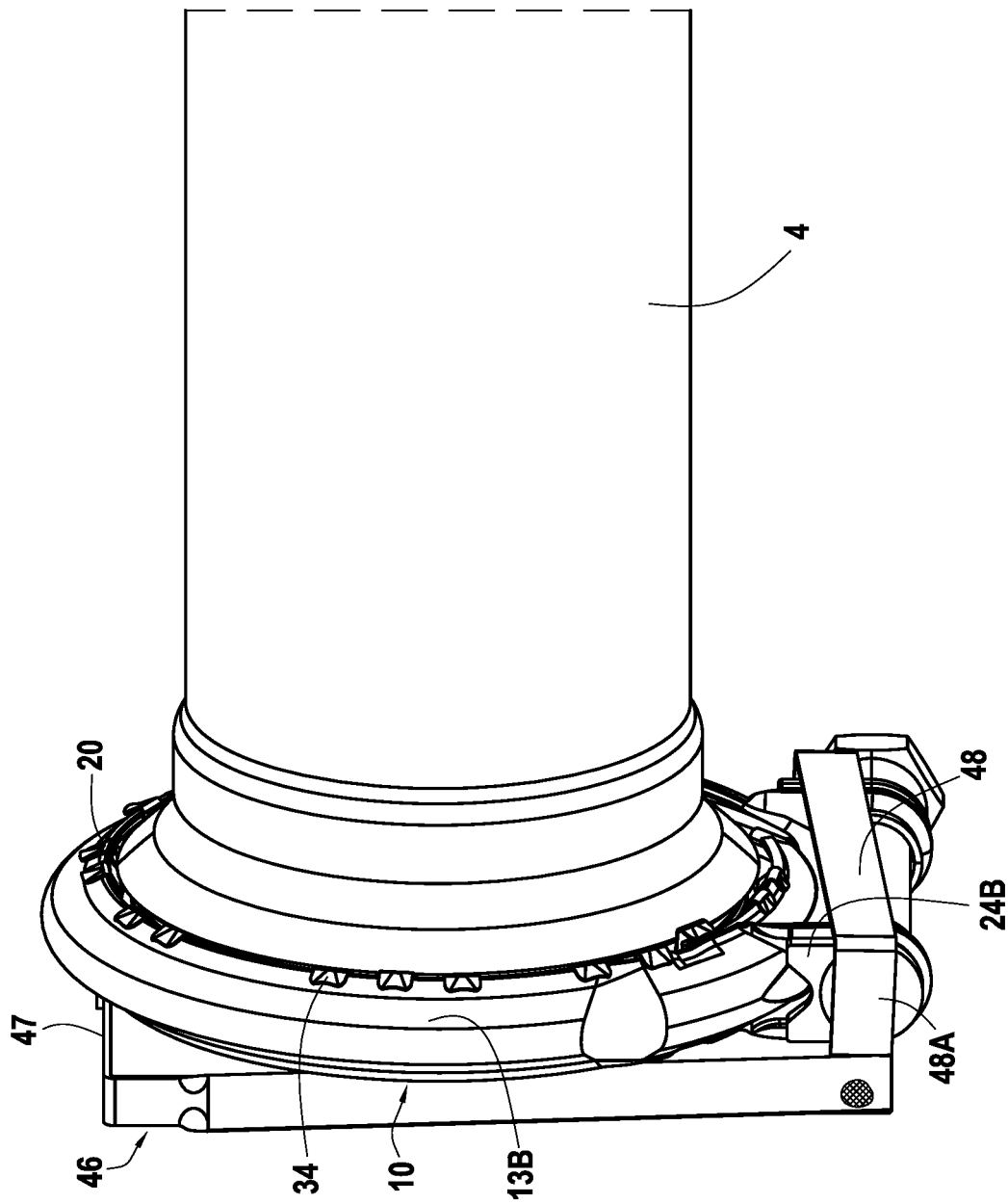
FIG. 2 shows a side view of the end of the second tube provided with a clamping system according to the disclosure, before its connection with the first tube.

FIGS. 1 and 2 are described at first. It can be seen in these figures that the clamping system comprises a collar 10, of the same type as the one described in EP 2 598 785 and a washer 28, which cooperate to assemble two tubes 2, 4.

In the following, "radially internal" elements refers to elements that are directed towards the axis A of the two tubes placed end to end and that are closest to this axis A relative to other elements referred to as "radially external" elements, the "radially external" elements being those that are directed away from the axis A. It is also considered that the axis A of the two tubes is also the axis of the collar, more specifically the axis of the collar belt, the latter being wound on itself.

Furthermore, a second element is considered "external" or "axially external" to a first element, if the second element is located next to the first one, that is to say outside the axial slice occupied by the first element.

The collar comprises a belt 12 which delimits a recess 14 in which the clamping surfaces, respectively 18 belonging to the first tube 2 and 20 belonging to the second tube 4 can be inserted. This recess and these clamping surfaces have shapes such that the clamping of the belt of the collar forces the ends of the tubes 2 and 4 to come close to each other. The recess 14 is delimited between a first and a second flank 13A and 13B of the belt 12, these flanks defining in this case the branches of a V seen in axial section. Thus, the belt 12 has an advantageously V-shaped axial section, while the clamping surfaces 18 and 20 have a diameter which increases progressively towards the opposite free ends of the tubes and have for example a frustoconical shape.

The belt 12 has ends respectively 12A and 12B, which are straightened substantially radially so as to form bearing lugs. These lugs are pierced so as to allow the passage of the rod 24A of a clamping screw 24 through these lugs. The head 24B of the screw is wedged relative to one of the bearing lugs, in this case the lug 12B, while a nut 26 is retained relative to the other bearing lug 12A. It is understood that the rotation of the nut in the direction of screwing brings the bearing lugs closer to each other and therefore reduces the inner diameter of the collar, that is to say it allows clamping the belt of the collar. Of course, other ways of clamping the belt can be envisaged, for example hooking systems, as described in particular in patent application FR 3 008 160.

The clamping system comprises a washer 28 which is secured to the collar. The washer may particularly be of the type described in EP 1 451 498.

This washer 28 has a frustoconical annular portion 30 which can be inserted between the opposite ends of the two tubes 2 and 4 when they are engaged in the clamping system. Indeed, the washer 28 is retained relative to the belt, in this case relative to its second flank 13B, by fastening lugs so that an annular space is arranged between the second flank and the washer. The free end of the second tube 4 carrying its clamping surface 20 is inserted into this annular space inside the recess 14, while the free end of the first tube 2 carrying its clamping surface 18 is inserted on the opposite side of the annular space relative to the washer, that is to say against the internal face of the frustoconical portion 30 of the washer 28.

In this case, the end of the tube 4 is a female flared part, the internal periphery of its clamping surface 20 forming a flared part. On the other hand, the free end of the first tube 2 is a male end which, beyond its clamping surface 18, has an outer periphery 23 whose diameter gradually decreases towards the termination of the free end. The end part 23 thus formed can therefore be inserted, substantially in a form-fitting manner, inside the flared part formed at the end of the tube 4. The frustoconical portion 30 of the washer 28 may have annular deformations 32 forming a seal between the internal surface of the flared part 19 and the external periphery 23.

The fastening of the washer 28 of the collar 10 and/or the pre-mounting of the clamping system comprising the collar and the washer on the tube 4 can be ensured in the same way as in EP 1 451 498, by fastening lugs and/or pre-mounting lugs 34 with which the washer is equipped, these lugs serving to hook the washer on the second flank 13B of the belt, while arranging the abovementioned annular space, as described in EP 1 451 498.

Other modes of fastening the washer to the collar can be used. For example, the washer may have a retaining loop in which the shank of the screw 24 can be engaged, as well as one or several retaining lugs which can be retained on the edge of the belt, for example by hooking or by pinching. Likewise, other modes of pre-mounting the clamping system relative to the tube 4 can be used, for example by equipping the washer with internal lugs or studs engaged in the tube 4 to cling on the internal surface of the tube 4.

The collar carries an external retaining device 40.

Figure 3:
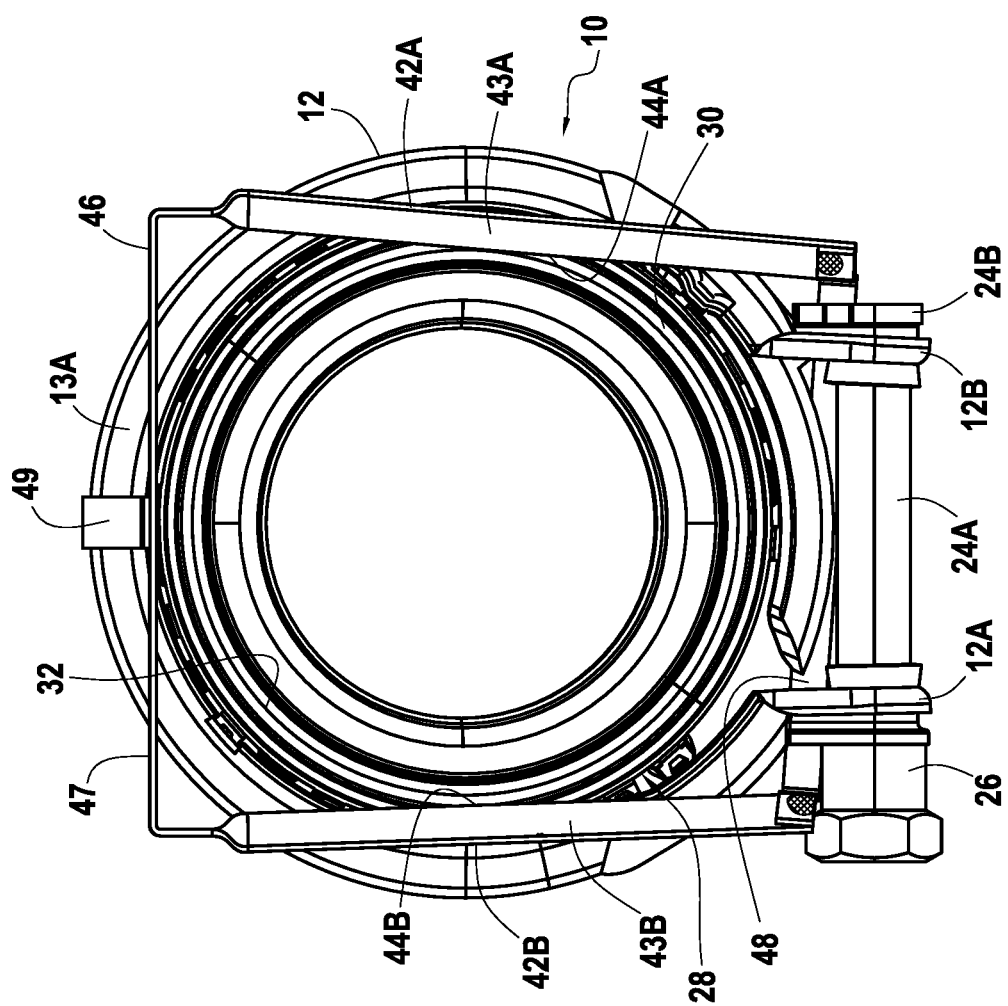
FIG. 3 is an end view of FIG. 2.

This external retaining device comprises in this case two retaining bars respectively 42A and 42B which are disposed axially outside the collar, more specifically by being located axially next to the first flank 13A of the belt. Each of these retaining bars is oriented transversely to the axis A of the collar. In this case, they form at rest rectilinear segments parallel to each other. As best seen in FIG. 3, each retaining bar has a transverse retaining ridge, respectively 44A and 44B. In this case, these transverse retaining ridges are parallel to each other and perpendicular to the axis A of the collar.

In this case, for each retaining bar, the retaining ridge, respectively 44A and 44B, is formed at the end of a ramp, respectively 43A and 43B. The ramps form sliding surfaces which gradually flare outwardly, that is to say as moving away from the first flank 13A. These ramps can thus cooperate with the external periphery 23 of the free end of the tube 2 during the insertion of its clamping surface 18 into the clamping system in order to space away the retaining bars.

As seen in FIGS. 1 and 3, the external retaining device 40 comprises a polygonal frame 46 whose retaining ridges form two sides diametrically opposite to each other. In this case, this frame is generally symmetrical relative to a radial plane of the clamping system perpendicular to the axis A. The frame 46 therefore has two parallel sides 42A and 42B formed by the retaining bars. This frame 46 further comprises two support sides, namely on the one hand, a first support side 47 through which the frame 46 is fastened to the first flank 13A and on the other hand, a second support side 48, better visible in FIG. 2, which is wedged against displacement relative to the collar. In this case, the external retaining device 40 is fastened to the first flank 13A of the belt 12 by a lug 49. This lug is for example welded to the first flank. When, as represented, the external retaining device comprises the polygonal frame 46, the lug 49 is formed by an extension, particularly an axial extension, of the first support side 47.

In this case, the second support side 48 of the frame is retained against displacement relative to the collar both in a transverse plane and in an axial direction.

Indeed, it can be seen that this second side 48 comprises a rearward set-back that is to say in the direction going towards the second flank 13B. This set-back is delimited by cheeks 48A and 48B between which the bearing lugs 12A and 12B of the belt 12 extend. The support side 48 is therefore wedged by these bearing lugs 12A and 12B with respect to the displacements in a transverse plane, particularly perpendicular to the axis A.

Furthermore, the common part of the support side 48 which extends between the cheeks 48A and 48B is located at the rear of the bearing lugs 12A and 12B as opposed to the rest of the frame 46 which is located at the front of the flank 13A. The side 48 is therefore also retained by the bearing lugs 12A and 12B of the belt with respect to an axial displacement towards the front, that is to say along the arrow F indicated in FIG. 1.

For the mounting of the assembly comprising the two tubes and the clamping system, the free end of the tube 4 is first engaged in the collar, that is to say radially inside the flank 13B of the belt. In this case, the free end of this tube carrying the clamping surface 20 may then be located in the annular space arranged between the washer 28 and the flank 13B. Thus, the clamping system is pre-mounted around the free end of the tube 4. Then, the free end of the first tube 2 is inserted inside the clamping system by moving this free end backwards, in the opposite direction to the arrow F indicated in FIG. 1. In doing so, the end part 23 of the first tube 2 cooperates with the retaining bars 42A and 42B to space them apart radially. When they are present, the ramps 43A and 43B can facilitate the cooperation between the surface 23 and the retaining bars to naturally space them apart.

Once the clamping surface 18 of the tube 2 has reached the rear of the retaining ridges 44A and 44B, the retaining bars can naturally recover their rest position in which they interfere with the edge of the first flank 13A, their respective retaining ridges each forming the chord of an arc whose arc part is formed by the portion of the edge of the first flank 13A located radially outside the considered retaining ridge.

Figure 4:
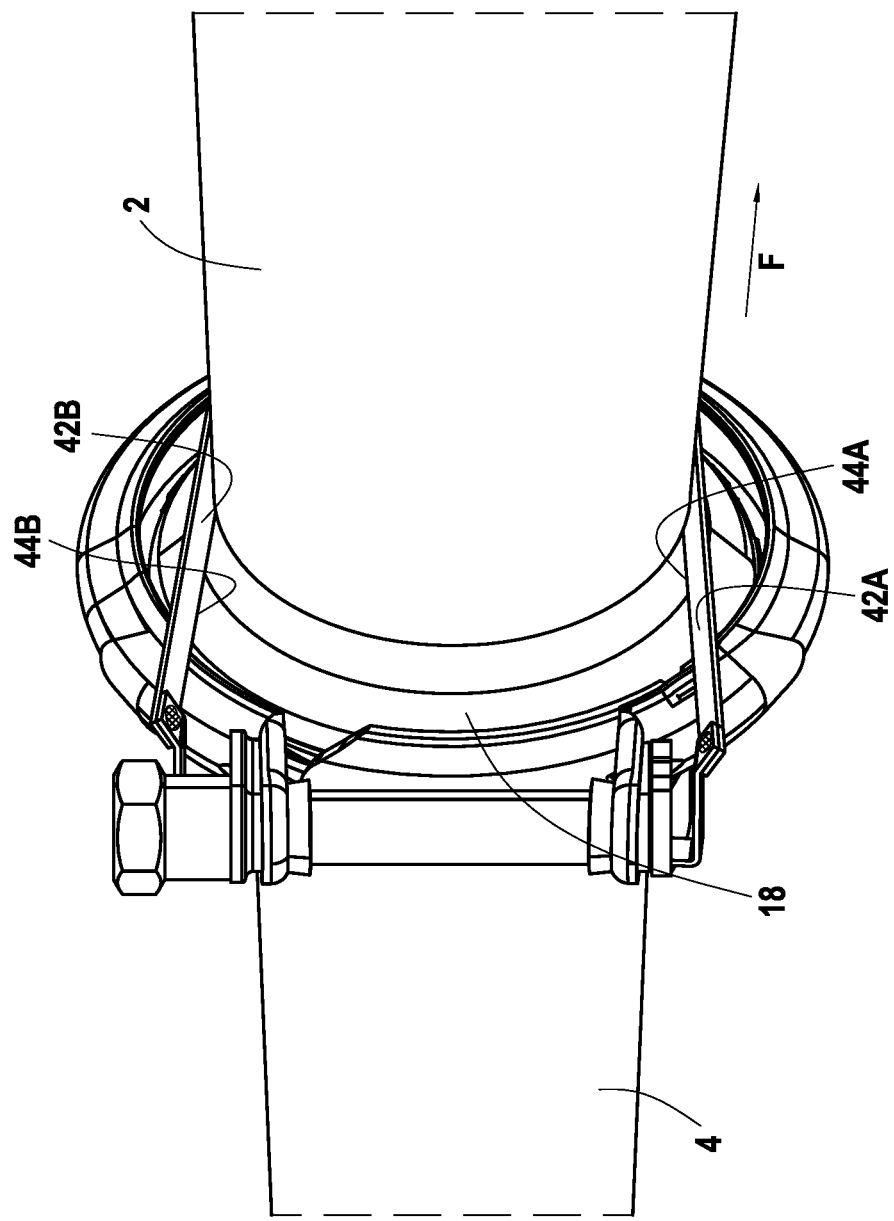
FIG. 4 is a side view showing the connected assembly.

We are thus in the situation represented in FIG. 4 in which the clamping system is pre-mounted on the two tubes that are pre-connected. It can indeed be seen in this figure that the retaining ridges 44A and 44B cooperate with the clamping surface 18 to oppose to a movement of the first tube 2 forwards, in the direction of the arrow F, relative to the clamping system.

The clamping belt and the washer as well as the external retaining device are preferably made of metal. For example, the washer and the retaining device can be made in a stainless steel strap of the austenitic type, and having particularly a thickness comprised between 0.1 mm and 0.5 mm, or even between 0.2 and 0.4 mm.

The invention claimed is:

1. A clamping system for connecting a first and a second tube whose opposite ends have clamping surfaces protruding from cylindrical outer surfaces of said tubes, the system comprising a collar which comprises a belt able to be clamped around said clamping surfaces, the belt having a first and a second flank between which an internal recess able to receive the clamping surfaces is delimited, the collar carrying an external retaining device comprising a retaining bar, said retaining bar protruding axially from the first flank while being oriented transversely to an axis of the collar and having a transverse retaining ridge that geometrically forms the chord of an arc formed by a part of an edge of the first flank located radially outside the transverse retaining ridge, said retaining bar being able, from a rest situation in which the retaining ridge projects towards the axis of the collar relative to the edge of the first flank in an unclamped position of the collar, to be elastically deformed to space the retaining ridge away from the axis of the collar.

2. The clamping system according to claim 1, wherein the retaining ridge is formed at the end of a ramp.

3. The clamping system according to claim 1, wherein the external retaining device is fastened by a lug to the first flank of the belt.

4. The clamping device according to claim 3, wherein the lug is welded on the first flank.

5. The clamping system according to claim 1, wherein the external retaining device comprises a polygonal frame, the retaining ridge being formed on one of the sides of the polygonal frame.

6. The clamping system according to claim 5, wherein the polygonal frame comprises two support sides via which the polygonal frame is supported by the collar.

7. The clamping system according to claim 6, wherein one of the support sides is fastened to the first flank and the other of the support sides is wedged against displacement relative to the collar.

8. The clamping system according to claim 1, wherein the external retaining device has two retaining bars, disposed on either side of the axis of the collar.

9. The clamping system according to claim 8, wherein the external retaining device comprises a polygonal frame comprising two support sides via which the polygonal frame is supported by the collar, the retaining ridge being formed on one of the sides of the polygonal frame, and wherein the external retaining device has two retaining bars, disposed on either side of the axis of the collar, the two retaining bars extending between the two support sides.

* * * * *